United States Patent [19]

Heeler et al.

[11] Patent Number: 4,834,830
[45] Date of Patent: May 30, 1989

[54] OSCILLATING SEALING WIRE ASSEMBLY FOR WRAPPING MACHINES

[75] Inventors: David E. Heeler, Green Bay; John M. Pamperin, Oneida, both of Wis.

[73] Assignee: FMC Corporation, Chicago, Ill.

[21] Appl. No.: 222,467

[22] Filed: Jul. 21, 1988

[51] Int. Cl.[4] ............... B65B 51/14; B65B 51/26; B65B 9/06
[52] U.S. Cl. ................... 156/583.1; 53/77; 53/373; 53/550; 156/466; 493/193; 493/470
[58] Field of Search ............... 53/75, 77, 373, 550, 53/551, 552; 156/203, 380.1, 466, 583.1, 583.2; 219/243, 244; 493/193, 205, 207, 208, 209, 303, 304, 470

[56] References Cited
U.S. PATENT DOCUMENTS 2,718,915 9/1955 Piazze ..................... 156/466 X
2,741,296 4/1956 Collins ..................... 156/466 X
3,454,450 7/1969 Tyrrell ..................... 156/580.1 X
3,473,288 10/1969 Nakamura et al. ............... 53/550 X
4,084,999 4/1978 Rucker ..................... 156/466
4,490,962 1/1985 Weis et al. ..................... 53/373 X Primary Examiner—Robert L. Spruill
Assistant Examiner—Ann Tran
Attorney, Agent, or Firm—Lloyd B. Guernsey; R. C. Kamp

[57] ABSTRACT

An oscillating sealing wire for high speed sealing of thermoplastic film. The sealing wire curved in the shape of a bow rocks back and forth across the moving surface of a thermoplastic film so the wire continuously presents a hot surface to the film. The film removes heat from the wire surface which touches the film. The oscillating wire continuously presents a new hot surface to the film to allow high speed movement of the film and still obtain a good seal.

8 Claims, 2 Drawing Sheets

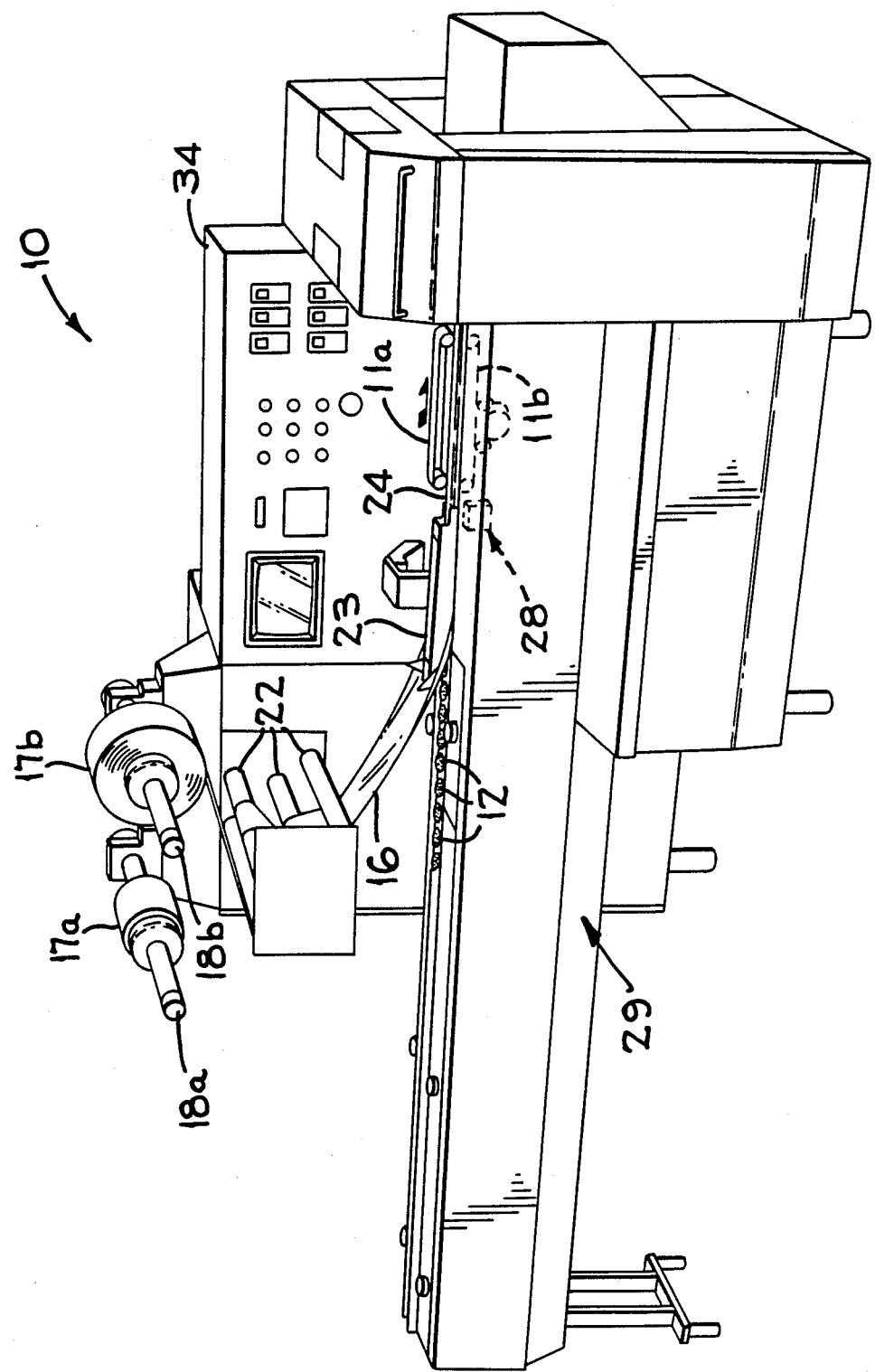

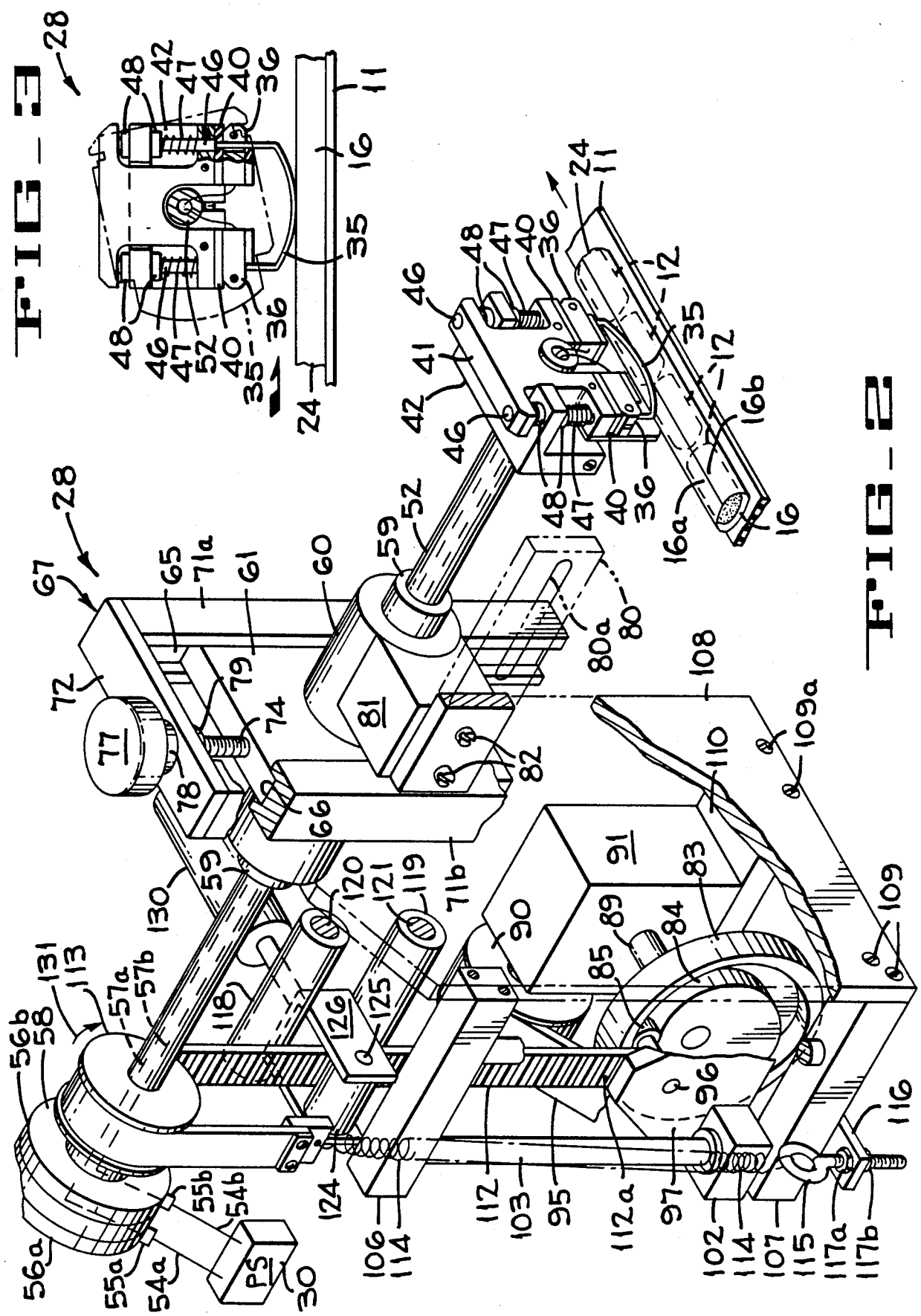

OSCILLATING SEALING WIRE ASSEMBLY FOR WRAPPING MACHINES

BACKGROUND OF THE INVENTION

The present invention relates to horizontal wrapping machines, and more particularly to an oscillating sealing wire assembly for heat sealing layers of continuously moving thermoplastic film for forming packages.

A wrapping machine in which the present invention can be used is disclosed in U.S. Pat. No. 4,712,357 issued to Crawford et al, Dec. 15, 1987. The wrapping machine feeds a succession of articles into a traveling tube of thermoplastic material which is sealed longitudinally and severed and sealed between the articles to produce individual hermetically sealed packages.

SUMMARY OF THE INVENTION

The present invention discloses an oscillating sealing wire assembly for high speed heat sealing of two layers of continuously moving thermoplastic film. An electrically heatable resistance wire is formed in a curved bow-shape and movably mounted against the moving film. A source of electrical power is connected to the resistance wire to provide heat for sealing the film. As the film moves across the heated wire, the film removes heat from the surface of the wire where the wire touches the film. To compensate for this heat loss the curved resistance wire is oscillated back and forth in the general manner of a runner of a rocking chair as the chair runner rocks over an area on a floor, to sequentially move different portions of the wire surface against the moving film. This rocking action allows the wire to provide continuous heat to the film and seals the film as the film moves past the wire at a rapid rate. A heart-shaped cam drives the wire at a constant velocity to provide even heat to the film. Apparatus is provided for moving the wire away from the film when the film stops moving to prevent melting a large hole in the film.

BRIEF DESCRIPTION OF THE DRAWINGS

FIG. 1 is a perspective of a horizontal wrapping machine incorporating the oscillating sealing wire assembly of the present invention.

FIG. 2 is a perspective of the oscillating sealing wire assembly which can be used in the wrapping machine of FIG. 1.

FIG. 3 is a side elevation of a portion of the oscillating sealing wire assembly of FIG. 2.

DESCRIPTION OF THE PREFERRED EMBODIMENT

A horizontal wrapping machine 10 in which the present invention can be used is shown in FIG. 1. Wrapping machine 10 includes a pair of movable belts 11a, 11b for transporting a plurality of articles 12 to be wrapped in a thermoplastic film 16 supplied from one of a pair of rolls 17a, 17b mounted on a pair of support shafts 18a, 18b. Film 16 is threaded over a plurality of rollers 22 and is engaged by a forming device 23 which forms the sheet of film 16 into a tube 24 (FIG. 2) surrounding articles 12. A sealing wire assembly 28 (FIG. 2) mounted on wrapping machine 10 heats the edges 16a, 16b of film 16 to secure the film in the form of a tube. Electronic control circuitry (not shown) and a power supply 30 (FIG. 2) are mounted in a control cabinet 34 (FIG. 1) of wrapping machine 10.

Sealing wire assembly 28 (FIGS. 2, 3) includes a curved bow-shaped sealing wire 35 connected between a pair of terminals 36. A plurality of electrical insulators 40 isolate terminals 36 from an H-shaped holder 41. Holder 41 is spring mounted to an angle bracket 42 by a pair of guide rods 46, a pair of coil springs 47 and a pair of linear motion ball bearings 48. Angle bracket 42 is clamped to a hollow shaft 52. Power supply 30 is connected to terminals 36 by a pair of leads 54a, 54b, a pair of brushes 55a, 55b slidably engaging a pair of slip rings 56a, 56b, and by a pair of leads 57a, 57b extending through hollow shaft 52. Slip rings 56a, 56b are mounted on a drum 58 which is mounted on shaft 52, with slip rings 56a, 56b being electrically insulated from each other in a conventional manner.

Shaft 52 ((FIGS. 2, 3) is rotatably mounted in a pair of bearings 59 secured to a housing 60. Housing 60 (FIG. 2) is connected to a vertically movable plate 61 which is mounted in a pair of grooves 65, 66 of a fixed U-shaped frame 67. Frame 67 includes a pair of vertical members 71a, 71b and a horizontal member 72. A threaded shaft 74, a knob 77 and a pair of collars 78, 79 move plate 61 up or down relative to horizontal member 72 of frame 67 when knob 77 is rotated. Rotating knob 77 adjusts the height of wire 35 relative to belt 11 to accommodate different size articles 12. Springs 47 bias wire 35 against tube 24 so that wire 35 presses against tube 24 in an area between articles and allows wire 35 to move upward if a product jam occurs on belt 11. This prevents bending wire 35. The lower ends of vertical members 71a, 71b are fixed to wrapping machine 10 inside cabinet 29 in a conventional manner. A bracket 80 (FIG. 2) secured to a block 81 by a plurality of bolts 82 includes a slot 80a for adjustably connecting forming device 23 (FIG. 1) to sealing wire assembly 28. A plurality of bolts (not shown) can be adjustably extended through slot 80a and connected to forming device 23. Forming device 23 moves up and down with movable plate 61 but can be adjusted relative to block 81 and sealing wire 35. When shaft 52 (FIGS. 2, 3) oscillates, wire 35 rocks back and forth over the surface of tube 24 in the same manner as rocking chair runners rock over a floor. The remainder of the apparatus disclosed in FIG. 2 provides an oscillating motion to shaft 52 and lifts wire 35 away from tube 24 when tube 24 is not moving.

The oscillation of shaft 52 (FIG. 2) is actuated by a cam 83 having a heart-shaped groove 84 and a cam follower 85 positioned in groove 84. Cam 83 is mounted off center on a rotatable shaft 89 which is rotatably driven by a pulley 90 through a worm gear 91. A drive belt 95 supplies power to drive pulley 90. Cam follower 85 is mounted on a pin 96 which is connected to a horizontal member 97. Horizontal member 97 is connected to a pair of bushings 102 (only one being shown). Bushings 102 are slidably mounted on a pair of vertical rods 103 connected between a pair of rod support blocks 106, 107. Blocks 106, 107 are secured to a support plate 108 by a plurality of bolts 109. Worm gear 91 is mounted on a plate 110 which is secured to plate 108 by a plurality of bolts 109a. When cam 83 rotates, cam follower 85, member 97 and bushing 102 move up and down as cam follower 85 moves in groove 84. A toothed belt 112 connected to member 97 is looped over a pulley 113 and connected to a spring 114. Spring 114 is connected to an eye bolt 115 which is secured to rod support block 107 by a bracket 116. A pair of nuts 117a, 117b adjust the amount of tension provided by spring 114. As an end 112a of belt 112 moves up and down, belt 112 and spring 114 cause pulley 113 and shaft 52 to oscillate which causes holder 41 and sealing wire 35 to oscillate. The cam profile is arranged so that the wire 35 moves at a constant velocity. At each end of the stroke, the oscillating motion of wire 35 (FIGS. 2, 3) reverses almost instantaneously so a new hot surface of wire 35 is continuously presented to thermoplastic tube 24.

A pair of rollers 118, 119 (FIG. 2) are mounted on a corresponding pair of shafts 120, 121 adjacent to belt 112, and shafts 120, 121 are secured to support plate 108. Another roller 124 is rotatably connected by a pin 125 to a cradle 126. An air cylinder 130 connected to cradle 126 moves roller 124 horizontally toward and away from belt 112. When belt 11 and tube 24 stop moving, air cylinder 130 is actuated which pulls roller 124 toward the right (FIG. 2) to wrap belt 112 around a portion of rollers 118, 119. This causes pulley 113, shaft 52 and holder 41 to rotate clockwise as shown by an arrow 131 and rotates wire 35 upward out of contact with tube 24 into the position shown by the dashed lines of FIG. 3. This action prevents the melting of large areas of the thermoplastic film when belt 11 is not moving.

As a thermoplastic tube is pressed against the oscillating heating wire of the present invention, heat is removed from the wire. The oscillating wire moves across the surface of the thermoplastic tube to continuously present a hot wire surface to the tube. This allows the tube to be moved across the wire at a rapid rate to provide high speed sealing of tubes which enclose a variety of articles.

Although the best mode contemplated for carrying out the present invention has been herein shown and described, it will be apparent that modification and variation may be made without departing from what is regarded to be the subject matter of the invention.

What is claimed is:

1. An oscillating sealing wire assembly for high speed heat sealing of layers of continuously moving thermoplastic film, said assembly comprising:
   an electrically heatable sealing wire;
   means for mounting said wire adjacent to said moving thermoplastic film;
   a source of electrical power;
   mean for selectively connecting said electrical power to said wire; and
   means for constantly oscillating said sealing wire to sequentially present newly heated surfaces against said moving thermoplastic film.

2. An oscillating assembly as defined in claim 1 including means for moving said sealing wire away from said film when said film stops moving.

3. An oscillating assembly as defined in claim 1 including an oscillating shaft and means for mounting said sealing wire on said shaft.

4. An oscillating assembly as defined in claim 1 wherein said sealing wire is formed in a curved bow shape to keep said sealing wire pressed against said film as said sealing wire oscillates.

5. An oscillating assembly as defined in claim 4 including means for moving said sealing wire in a constant velocity rocking motion against said thermoplastic film.

6. An oscillating sealing wire assembly for high speed heat sealing of two layers of continuously moving thermoplastic film, said assembly comprising:
   an electrically heatable sealing wire;
   means for pivotally mounting said wire adjacent to said moving thermoplastic film;
   a source of electrical power;
   means for selectively connecting said electrical power to said wire;
   means for biasing said wire against said adjacent thermoplastic film; and
   means for constantly oscillating said sealing wire to sequentially present newly heated surfaces against said moving thermoplastic film.

7. An oscillating assembly as defined in claim 6 wherein said sealing wire is shaped in a manner to allow said sealing wire to move across said thermoplastic film in a rocking movement during at least a portion of oscillating movement of said sealing wire to continuously present newly heated surfaces to said thermoplastic film.

8. An oscillating assembly as defined in claim 6 including means for moving said sealing wire away from said film when said film stops moving.

* * * * *